(12) United States Patent
Inamoto

(10) Patent No.: US 6,982,767 B2
(45) Date of Patent: Jan. 3, 2006

(54) LIQUID CRYSTAL PROJECTOR

(75) Inventor: Masayuki Inamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 37 days.

(21) Appl. No.: 10/847,577

(22) Filed: May 18, 2004

(65) Prior Publication Data

US 2004/0233341 A1 Nov. 25, 2004

(30) Foreign Application Priority Data

May 20, 2003 (JP) .............................. 2003-142218

(51) Int. Cl.
*G02F 1/13* (2006.01)

(52) U.S. Cl. .............................................. 349/8; 349/9
(58) Field of Classification Search .................... 349/8, 349/9
See application file for complete search history.

(56) References Cited

U.S. PATENT DOCUMENTS 5,959,704 A * 9/1999 Suzuki et al. .................. 349/9
6,046,858 A   4/2000 Scott et al.

* cited by examiner

*Primary Examiner*—James A. Dudek
(74) *Attorney, Agent, or Firm*—Arnold International; Bruce Y. Arnold

(57) ABSTRACT

Green, red and blue S-polarized light beams are incident into respective green, red and blue liquid crystal light valves. In the green liquid crystal light valve, the green P-polarized light beams exit from pixels for performing the white dot display, and the green S-polarized light beam exits from pixels for performing the black dot display. In red and blue liquid crystal light valves, the red and blue S-polarized light beams exits from the pixels for performing the white dot display, and the red and blue P-polarized light beams exit from the pixels for performing the black dot display. The red and blue S-polarized light beams reflect on, and the green P-polarized light beam transmits through the cross-dichroic prism, to produce a full-color image. The full-color image is projected through a projecting lens on a screen.

6 Claims, 6 Drawing Sheets

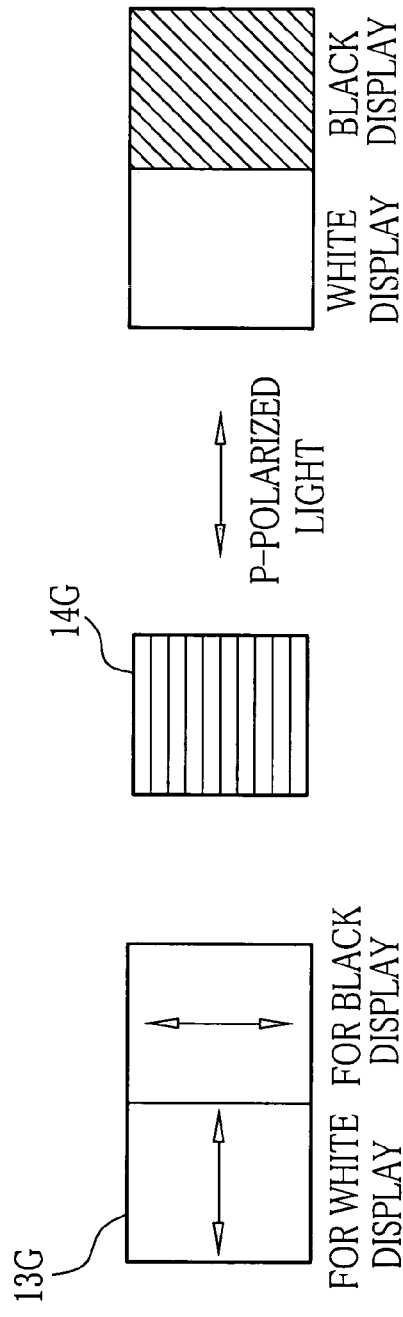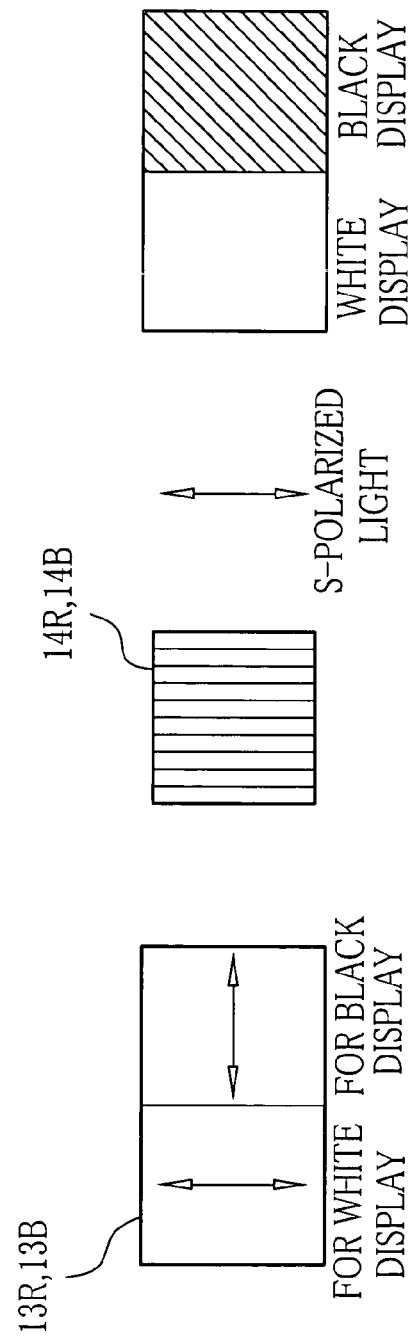
FIG.4A
FIG.4B

US 6,982,767 B2

LIQUID CRYSTAL PROJECTOR

BACKGROUND OF THE INVENTION

1. Field of the Invention

The present invention relates to a liquid crystal projector in which three liquid crystal panels corresponding to separated three red, green and blue light beams are used.

2. Description Related to the Prior Art

The liquid crystal projector projects a light through a projection lens to display an image on a screen with enlarging a small image displayed on a liquid crystal panel. As types of liquid crystal projector for displaying a color image, there are a single panel type in which only one liquid crystal panel is provided, and a three-panel type in which three liquid crystal panels are provided. The single panel type has merits in that the device has a simple structure and is cheap and small. However, an efficiency of using a light beam is small, the bright image is hardly displayed. Further, as the one liquid crystal panel is provided with three liquid crystal cells respectively corresponding to three RGB colors (R; red, G; green, B; blue). Accordingly, it is hard to display the image with higher fineness. In the three-panel type, there are demerits in the higher price than the single panel type, and in the larger size of the device. However, as three liquid crystal panels respectively corresponding to the RGB colors are used, the device can display the image with higher fineness.

As the liquid crystal projector of three panel type, U.S. Pat. No. 6,046,858 (Corresponding to Japanese Patent Publication No. 2001-520403) discloses a system for displaying a full-color image, which is provided with a color separating optical system, three light valves (liquid crystal panel of reflection type), a color composing member and a projecting lens. In the light separating optical system a white light beam of linear polarization is separated into light beams of RGB colors. The three light valves of reflecting type respectively receive the RGB light beams and perform the modulation thereof at each pixel depending on the image to be displayed. Then the modulated light beams exits from the pixels of three light valves. The color composing member composes the modulated light beams into one projection light, which is projected with enlargement through the projecting lens to form an image on a screen.

However, in the above liquid crystal projector, a cross-dichroic prism is used as the color composing member, and in order to increase an efficiency of using the light, an incident green light is previously polarized to a p-polarized light, and incident red and blue lights are previously polarized to an s-polarized light. In this case, according to the characteristics of the dichroic mirrors, the p-polarized green light travels through the cross-dichroic prism, and the s-polarized incident red and blue lights reflect on the cross dichroic mirrors. Thereafter, the three S-, P-, and S-polarized lights are composed, which is named SPS composition.

In order to perform the SPS composition, as shown in FIG. 6, a ½ wavelength plate 132 is provided between a polarizing plate 114G and the reflection type light valve 131G for converting the polarizing direction of the light incident into the cross-dichroic prism. In the white dot display, each liquid crystal light valve reflects the incident light with the rotation of the direction of the polarization. In the black dot display, each liquid crystal light valve reflects the incident light without the rotation of the direction of the polarization.

The color combining optical system asks of the incident lights "SPS" characteristics for its better efficiency. Then, the incident lights to the reflection type liquid crystal display must be "PSP" characteristics. The outgoing lights from the color separating optical system have "SSS" characteristics. So, in the blue and the red light path, a ½ wavelength plate is needed between the color separating optical system and the liquid crystal display. However, as the ½ wavelength plate is provided, the number of parts becomes larger, and the assembling cost becomes higher. Therefore the producing cost becomes larger.

SUMMARY OF THE INVENTION

An object of the present invention is to provide a liquid crystal projector, in which the number of members and parts is reduced to make the producing cost lower.

In order to achieve the object and the other objects, the present invention includes a light source, a polarizing optical system, a color separating optical system, first-third liquid crystal light valves, a composing optical system and a projecting lens. A white illumination light irradiated from the light source is transformed by a polarizing optical system to a first linearly polarized light whose polarization direction (or polarizing direction) is a first direction. The first linearly polarized light is separated by a color separating optical system to first-third primary color linearly polarized lights.

In each first-third liquid crystal light valve, plural pixels are formed with arrangement in a matrix. In each pixel, a twist of liquid crystal condition changes to perform the white dot or black dot display (or to displaying white dots or black dots). The first primary color linearly polarized light is incident in the first liquid crystal light valve, and the second primary color linearly polarized light is incident in the second liquid crystal light valve. The third primary color linearly polarized light is incident in the third liquid crystal light valve.

In the white dot display, the first liquid crystal light valve transforms the first linearly polarized light into the second linearly polarized light, and in the black dot display, the first liquid crystal light valve exits from the first linearly polarized light without polarization. The polarization direction of the second linearly polarized light is perpendicular to that of the first linearly polarized light. In the white dot display, the second and third linearly polarized lights exits from the second and third liquid crystal light valves without polarization, and in the black dot display, the second and third liquid crystal light valves transforms the first linearly polarized light into the second linearly polarized light.

The first primary color image produced by the first liquid crystal light valve, the second primary color image produced by the second liquid crystal light valve, and the third primary color image produced by the third liquid crystal light valve are composed by the composing optical system. In the composition, the first primary color image transmits through or reflects on the composing optical system, and the second and third color images reflect on or transmit through the composing optical system. The composed color image is projected through the projecting lens on a screen with enlargement.

According to the liquid crystal projector, the number of parts becomes smaller, and the cost for alignment becomes lower. Therefore the cost for producing the liquid crystal projector becomes lower.

BRIEF DESCRIPTION OF THE DRAWINGS

The above objects and advantages of the present invention will become easily understood by one of ordinary skill in the art when the following detailed description would be read in connection with the accompanying drawings.

FIG. 4 is an explanatory view illustrating the modulating processes of the light beam in a light valve;

PREFERRED EMBODIMENTS OF THE INVENTION

Figure 1:
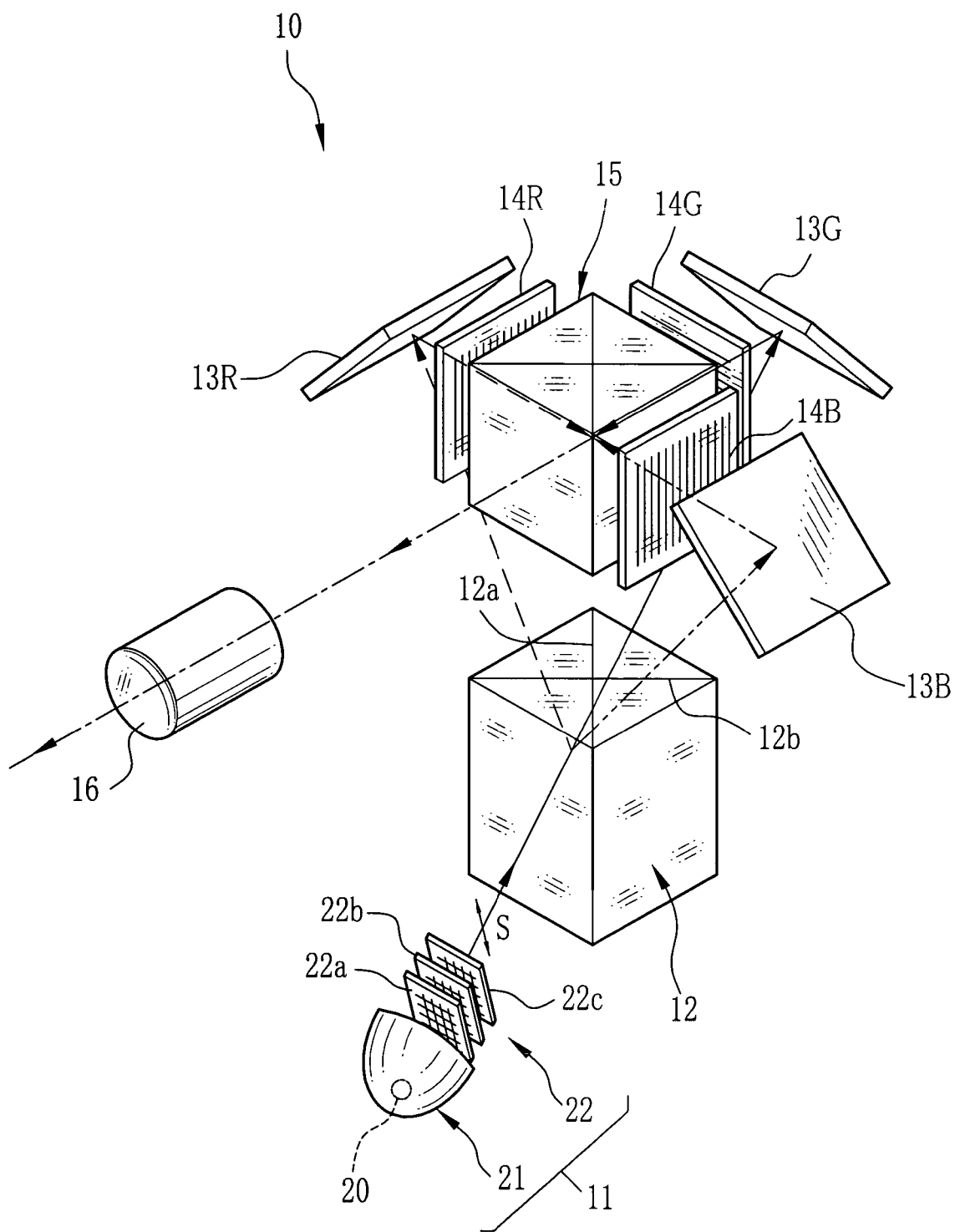
FIG. 1 is a perspective view illustrating an optical structure of a liquid crystal projector.

In FIG. 1, a liquid crystal projector 10 includes an illuminating device 11, a cross-dichroic prism 12 as an optical member for color separation, light valves 13R, 13G, 13B of reflection type, polarizing plates 14R, 14G, 14B, a cross-dichroic prism 15, and a projecting lens 16. The illuminating device 11 irradiates a white light of S-polarized light. Then color separation of the white light is made by the cross-dichroic prism 12 so as to separate the white light into three RGB light beams. These light beams are incident into the light valves 13R, 13G, 13B, which make the modulation of the light beams corresponding to an image to be displayed. The light beams after the modulation exits from the light valves 13R, 13G, 13B, to pass through the polarizing plates 14R, 14G, 14B, and composed to one light, to make a color composition. Then the light is projected with enlargement on a screen (not shown).

The illuminating device 11 is constructed of a lamp 21 having a light source 20 for irradiating a white illumination light and a light integrator 22 for converting a polarization of the white illumination light. The light integrator 22 is constructed of a first lens array 22a, a second lens array 22b, a PBS lens array 22c to which ½ wavelength plate is adhered, and the like. In the light integrator 22, the linearly polarization of the white illumination light is made larger, and converted into S-polarized light. Therefore the light integrator 22 emits the S-polarized light. As the conversion of the white light beam into the polarized light is made before the separation into RGB color lights with the color separating optical system, the number of the members and parts becomes smaller than when the conversion is made after the separation into RGB colors. Accordingly, this embodiments has a merit for making the space smaller.

The cross-dichroic prism 12 is constructed of four rectangular triangle prisms, and red dichroic mirrors (RDM) 12a and blue dichrioc mirrors (BDM) 12b are adhered with a transparent adhesive agent to surfaces forming the rectangular angle such that the RDM 12a and the BDM 12b may cross in the cross-dichroic prism 12. When the white illumination light enters into the cross-dichroic prism 12, a red light component reflects on the RDM 12a and exits as the red light beam to outside, and a blue light component reflects on the BDM 12b and exits as the blue light beam to outside. Further, a green light component passes through the RDM 12a and the BDM 12b and exits as the green light beam to outside. Thus the RGB light components in the white illumination light are separated to the RGB light beams. Note that the separation may be made with two dichroic mirrors instead of using the cross-dichroic prism.

Figure 2:
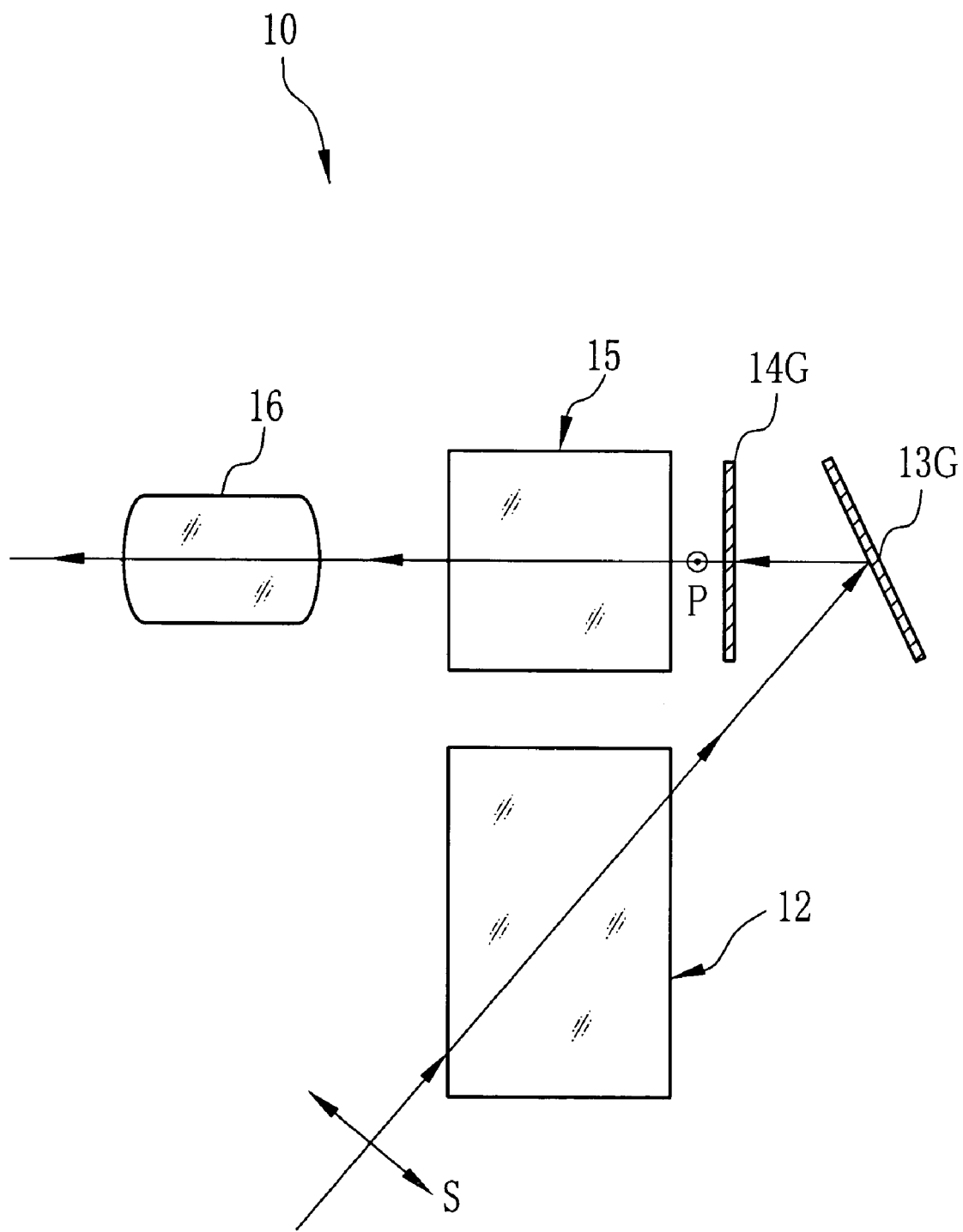
FIG. 2 is a sectional side view illustrating the optical structure of the liquid crystal projector.

The separated RGB light beams are incident into the light valves 13R, 13G, 13B which are disposed so as to respectively confront to three side surface of the cross-dichroic prism 15 as an optical member for color composition. As shown in FIG. 2, the green light beam reflects on the light valve (or G channel liquid crystal valve) 13G toward the prism 15. The light valve 13G is disposed such that the green light reflected thereon may be perpendicularly incident into an side surface of the prism 15. The light valves (or R and B channel liquid crystal valves) 13R, 13B are disposed in the same manner as the light valve 13G. Each light valve 13R, 13G, 13B is a liquid crystal display panel (LCOS) of reflection type. The light valves 13R, 13G, 13B are used for forming respective red, green, blue images (monochrome images) constructing the full-color image. The explanation of the light valve of the reflection type is made in followings.

Each light valve of reflection type, as already known, is filled with liquid crystal materials between a transparent glass and a silicone base plate. On an inner surface of the silicone base plate is formed a reflection layer on which aluminum evaporation is made. Further, in the transparent electrode is formed a common electrode. On the silicone base plate are formed individual electrodes and switching elements, such as TFT and the like. The individual electrodes are two-dimensionally disposed. Each individual electrode constructs a pixel. A voltage is applied individually to the electrodes through the corresponding TFT in responding to pixel data. In the liquid crystal layer to which the voltage is applied, the arrangement of the liquid crystal molecules is changed, and the liquid crystal layer has the same effect as a phase plate. Accordingly, the polarized incident light in the light valve is transmitted through the liquid crystal layer to the reflecting layer, reflects on the reflecting layer, and exits as a modulated light from the light valve. Thus the modulated light whose polarization direction is different from in the incident light exits from the liquid crystal layer to which the voltage is applied.

Otherwise, the voltage is not applied to non-selected ones of the plural pixels. The polarized light incident into the non-selected pixels is transmitted in a twisted structure of the initial orientation of the liquid crystal molecules to reflect on the reflecting layer. The reflected light is transmitted in the twisted structure reversely and exits from the light valve. Thus the light exiting from the non-selected pixels is the same polarization (or has the same polarization direction) as the incident light. The light exiting from the light valve is a mixture of the P-polarized light (as the modulated light) and S-polarized light (as the non-modulated light).

In the light valve 13G, the voltage is applied to the selected pixels to perform the white display, and not applied to the non-selected pixels so as to perform the black display. Namely, in the light valve 13G, the selected pixels modulate the S-polarizing light into the P-polarized light and the p-polarized light exits as the reflection, and the S-polarized light exits without modulation from the non-selected pixels.

Further, in the two light valves 13R, 13B, the voltage is not applied to the selected pixels to perform the white dot display, and applied to the non-selected pixels so as to perform the black dot display. Therefore the contrary selection of the pixels for the black dot display and white dot display is made to the light valve 13G. In the pixels the incident light is the S-polarized light. The S-polarized light exits without modulation from the selected pixels for performing the white display. The non-selected pixels for performing the black display modulate the S-polarizing light into the P-polarized light and the P-polarized light exits as the reflection light.

Between the cross-dichroic prism 15 and the light valves 13R, 13G, 13B are respectively disposed the polarizing plates 14R, 14G, 14B as an analyzer for cutting out a luminous flux in polarizing direction corresponding to the black display.

Figure 3:
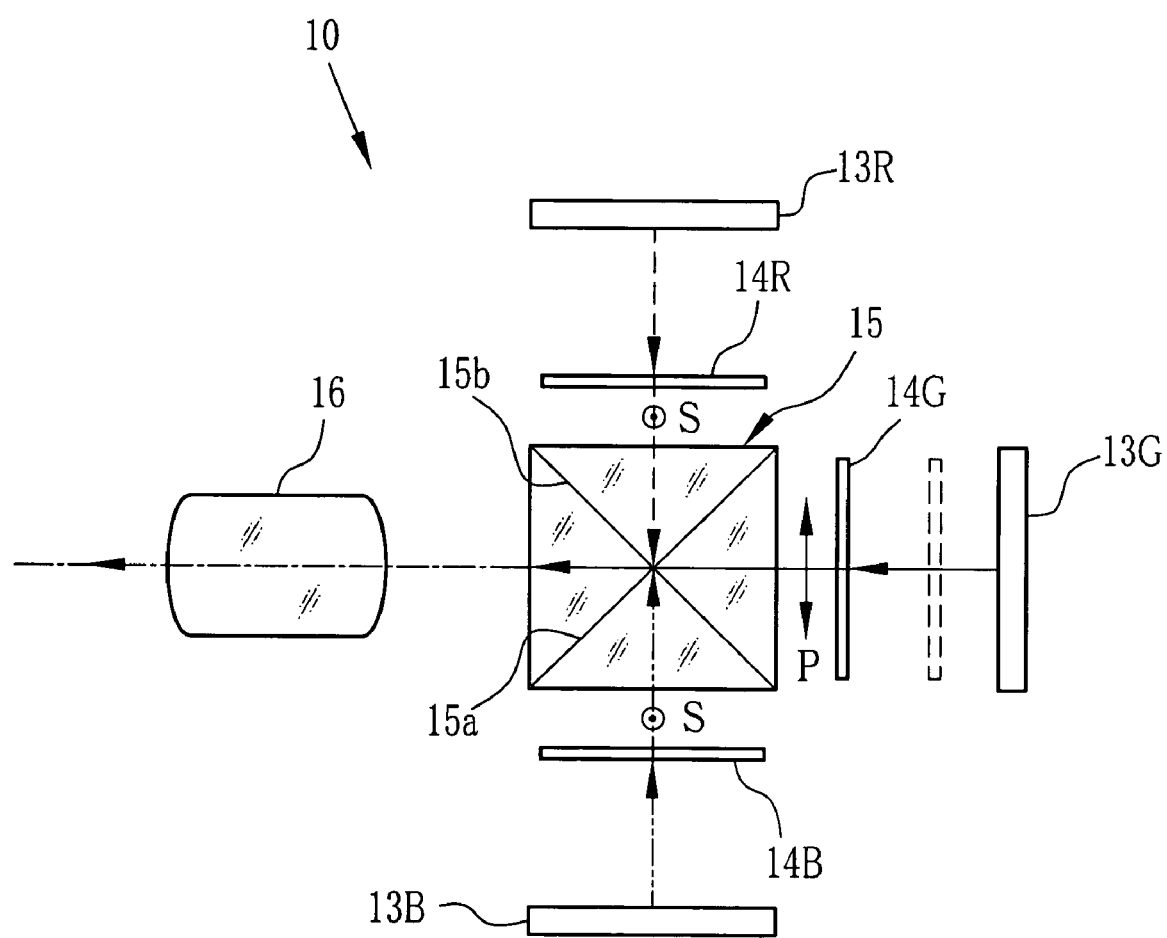
FIG. 3 is a plan view illustrating the optical structure of the liquid crystal projector.
Figure 5:
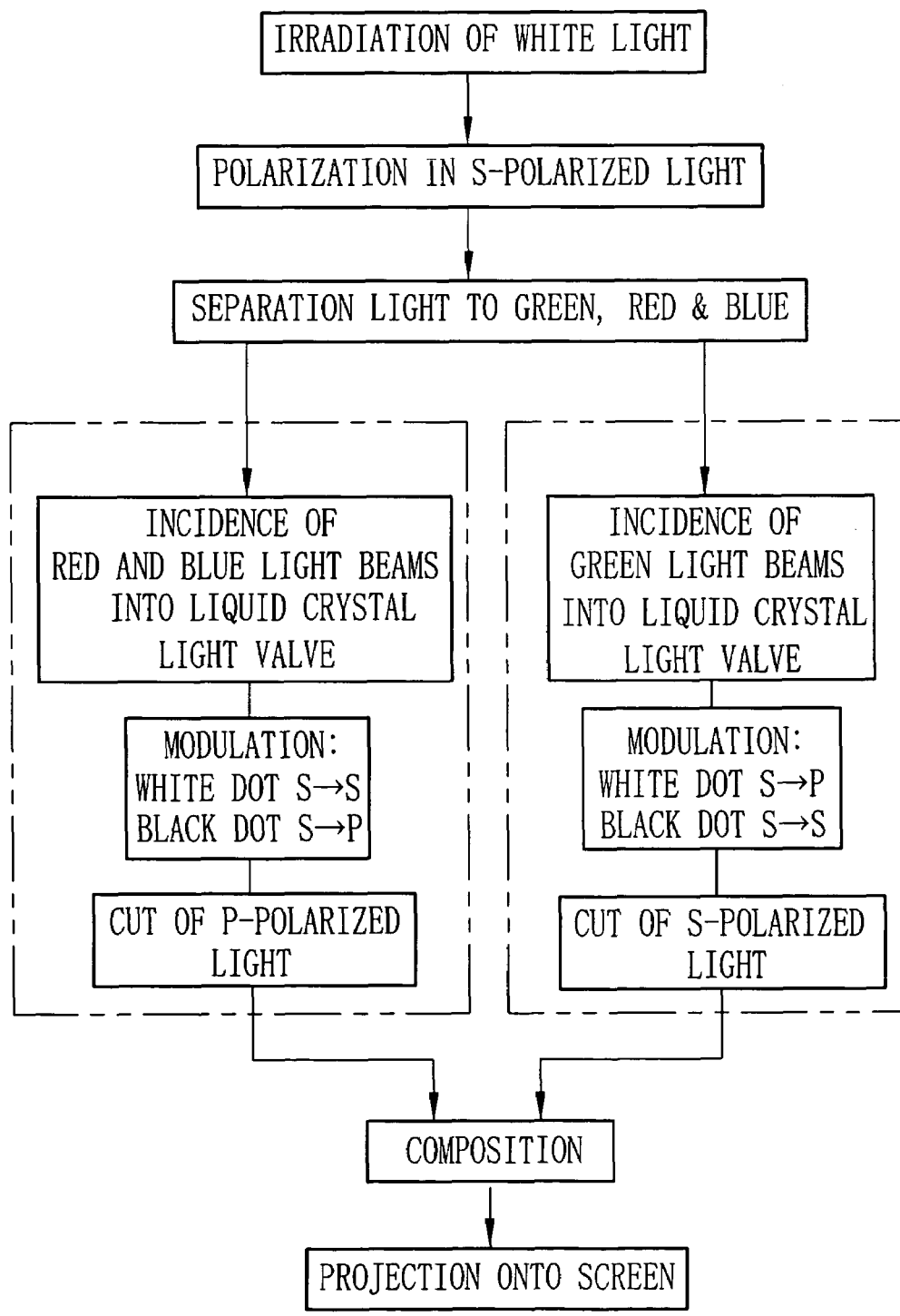
FIG. 5 is a flow chart of operations of the liquid crystal projector.

The reflections from the light valves 13R, 13G, 13B are incident into the cross-dichroic prism 15 of the optical member for color composition. As shown in FIG. 3, a center of the cross-dichroic prism 15 is positioned so as to have the same optical distance from the light valves 13R, 13G, 13B for composing the RGB light beams. The construction of the cross-dichroic prism 15 is the same as that of the above cross-dichroic prism 12 for color separation, and coated with a RDM 15a and BDM 15b.

There are two methods of color composition with use of the cross-dichroic prism, namely SSS composition and SPS composition, between which the polarizing directions are different. In the SSS composition, the incident light is the S-polarized light. Therefore, the polarizing direction of each RGB light beam incident into the cross-dichroic prism 15 is perpendicular to an incident surface of the cross-dichroic prism 15. Further, in the SPS composition, only the green light beam incident into the cross-dichroic prism 15 is the P-polarized light, and each red and blue light incident light into the cross-dichroic prism 15 is the S-polarized light.

The cross-dichroic prism has characteristics that the band of reflecting the P-polarized light becomes narrower than the S-polarized light. Therefore when the P-polarized light travels to pass or transmit through the cross-dichroic prism, the band of transmission is extremely wide. This characteristic is utilized to the SPS composition in the above embodiment. The polarizing direction of the green light beam reflecting on the light valve may be modulated from the S-polarized light into the P-polarized light, and the wavelength range of red and blue light beam to be cut out is shifted to be closer to the range of the green light. Thus not only the transmission loss of the green light beam but also the reflection loss of the red and blue light beams are reduced, and the efficiency of utilizing the light become larger.

In this embodiment, the light valve 13G is a channel of transmitting light, and the light valves 13R, 13B are channels of reflecting light. The green light beam as the P-polarized light reflected on the light valve 13G and the red and blue light beams as the S-polarized lights reflected on the light valves 13R, 13B are incident into the cross-dichroic prism 15, and the SPS composition of the red, green and blue light beams are made. Thus the efficiency of utilizing the light become larger.

The projecting lens 16 is positioned such that a focal length in a side of the cross-dichroic prism 15 may be the same as the optical distance from the light valves 13R, 13G, 13B, and another focal length in a side of the screen is the same as the optical distance from the screen. Accordingly the composed light is projected to form the full-color image on the screen.

Effects of the liquid crystal projector 10 having the above structure will be explained now in reference with FIG. 4. The white light irradiated by the lamp 21 is polarized into the S-polarized light by the light integrator 22. The polarized white light from the light integrator 22 enters into the cross-dichroic prism 12 as the optical member for color separation, and is separated into three RGB light beams. The green light beam is incident into the light valve 13G, and the red and blue light beams are incident into the respective light valves 13R, 13B. In the light valve 13G as the channel of the transmitting light, in the white dot display, the S-polarizing light is modulated into the P-polarized light as the reflection, and in the black dot display, the S-polarized light is reflected without modulating of the polarizing direction. The reflection from the light valve 13G is a mixed light beam of the P-polarized light and S-polarized light.

The polarizing plate 14G has a function as the analyzer for transmitting the P-polarized light and cut off the S-polarized light. Thus only the P-polarized light is incident into the cross-dichroic prism 15.

In the light valves 13R, 13B as the channels of the reflecting lights, the selected pixels for the white display reflects the S-polarized light without changing the polarizing direction, and the non-selected pixels modulate the S-polarized light into the P-polarized light as the reflection. Thus the reflection from each light valve 13R, 13B is a mixed light of the P-polarized light and the S-polarized light.

Each polarizing plate 14R, 14B has a function as the analyzer for transmitting the S-polarized light and cut off the P-polarized light. Thus only the S-polarized light is incident into the cross-dichroic prism 15.

Only the P-polarized light of the green light and the S-polarized lights of each red and blue light are incident into the cross-dichroic prism, in which the SPS composition is made. Thus the effects of utilizing the light are high and the composed light becomes brighter. After the SPS composition, the composed light is projected onto the screen with the projecting lens 16 to form the enlarged image on the screen.

Figure 6:
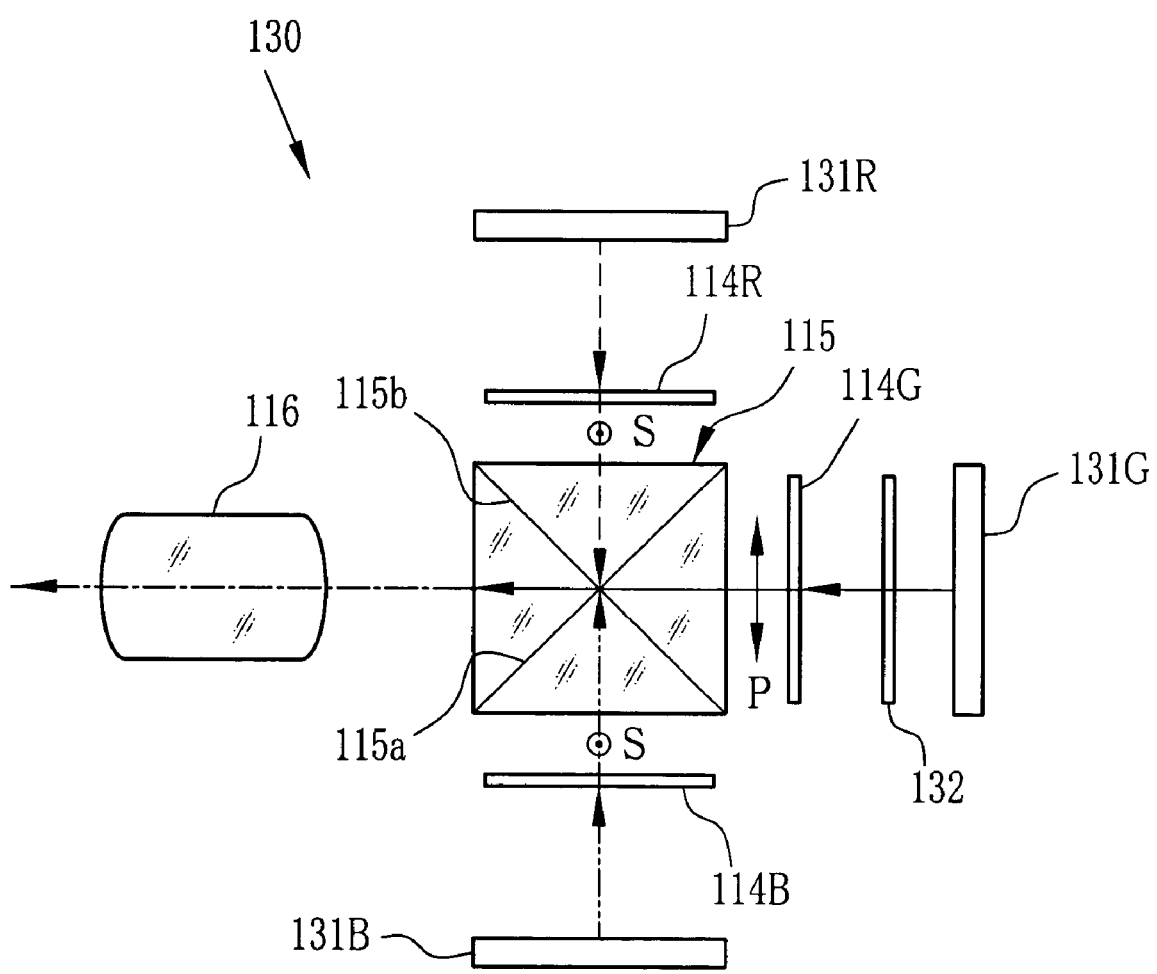
FIG. 6 is a plan view illustrating the optical structure of the liquid crystal projector in prior art.

As shown in FIG. 6, a liquid crystal projector 130 of the prior art has light valves of reflection type 131R, 131G, 131B, in which in the selected pixels for white display the S-polarized light is reflected without modulating the polarizing direction, and in the non-selected pixels for black display the S-polarized light is modulated into the P-polarized light. Thus the light valves 131R, 131G, 131B are driven in the same manner. Further, in order to make the SPS composition in the cross-dichroic prism 115, the liquid crystal projector 130 is provided with ½ wavelength plate 132 between the polarizing plate 114G and the light valve 131G as the channel for the transmitting light beam. In the ½ wavelength plate 132, the selected pixels in the channel of the transmitting light for performing the white display modulate the S-polarized light into the P-polarized light. Note that the numerals 115a, 115b are a RDM and a BDM. Further the numerals 114B, 114R are polarizing plate.

In the liquid crystal projector 10 of the present invention, the pixels of the light valve 13G are actuated for white and black display in a contra manner to those of the light valves 13R, 13B. Accordingly, as shown in FIG. 3, it is not necessary to use the ½ wavelength plate 132 in FIG. 6, and the number of the members and devices becomes smaller. Further, the cost for alignment in the production becomes lower.

In the above embodiment, the white illuminating light irradiated by the illuminating device is polarized into the S-polarized light with a polarizing device before incidence into the color separating optical system, and the SPS composition is made in the color composing optical device. However the present invention is not restricted in it, and may be applied to different structure. For example, the white luminance light may be polarized into the P-polarized light with the polarizing device. In this case, when the actuation manner of the light valves is exchanged between black and white displays, the same effects are obtained.

In the above embodiment, the light valves of reflection type are used. However, the present invention may be applied to a liquid crystal projector in which the light valves of the transmission type are used.

In the present invention, in the white dot display, the G channel liquid crystal light valve reflects the incident light with the rotation of the direction of the polarization, and in the black dot display, the G channel liquid crystal valve reflects the incident light without the rotation of the direction of the polarization.

Further, in the white dot display the B and R channel liquid crystal light valves reflect the incident light without the rotation of the direction of the polarization, and in the black dot display, the B and R channel liquid crystal light valves reflect the incident light with the rotation of the direction of the polarization. This difference can be achieved to drive the B and R channel liquid crystal light valves by negative signals. This difference can be achieved to drive the B and R channel liquid crystal light valves by negative signals. (For example, white dot is driven as "black", bright gray dot is driven as "dark gray", dark gray dot is driven as "bright gray", black dot is driven as "white", and so on.)

Various changes and modifications are possible in the present invention and may be understood to be within the present invention.

What is claimed is:

1. A liquid crystal projector comprising:
   a light source for irradiating a luminance light;
   a polarizing optical system for transforming said luminance light in a first linearly polarized light;
   a color separating optical system for separating said first linearly polarized light to first-third primary color linearly polarized light beams;
   a first liquid crystal light valve for modulating said first primary color linearly polarized light to produce a first primary color image, in performing the white dot display said first linearly polarized light being transformed into a second linearly polarized light which exits from said first liquid crystal light valve, and in performing the black dot display said first linearly polarized light, exiting from said first liquid crystal light valve, a polarization direction of said second linearly polarized light being perpendicular to that of said first linearly polarized light;
   second and third liquid crystal light valves for modulating said respective second color linearly polarized light and third primary color linearly polarized light to produce a second primary color image and a third primary color image, in performing the white dot display said first linearly polarized light exiting from said second and third liquid crystal light valves, and in performing the black dot display said first linearly polarized light being transformed into said second linearly polarized light which exits from said second and third liquid crystal light valves;
   a composing optical system for composing said first, second and third primary color images by transmitting or reflecting said first primary color image and reflecting or transmitting said second and third primary color images; and
   a projecting lens for projecting said composed color image.

2. A liquid crystal projector according to claim 1, wherein said first polarized light is an S-polarized light, said second polarized light is P-polarized light.

3. A liquid crystal projector according to claim 2, wherein polarizing plates are provided between said first light valve and said composing optical system for cutting said S-polarized light and between said each second and third light valve and said composing optical system for cutting said P-polarized light.

4. A liquid crystal projector according to claim 3, wherein said color separating optical system and said composing optical system are cross-dichroic prisms.

5. A liquid crystal projector according to claim 4, wherein said first-third primary colors are respectively green, red and blue.

6. A liquid crystal projector according to claim 5, wherein each cross-dichroic prism is constructed of a red dichroic mirror and a blue dichroic mirror.

* * * * *